(12) United States Patent
Bernhardt

(10) Patent No.: US 8,984,938 B1
(45) Date of Patent: Mar. 24, 2015

(54) METHODS AND SYSTEMS FOR WIND DETECTION

(75) Inventor: Roger David Bernhardt, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 122 days.

(21) Appl. No.: 13/493,024

(22) Filed: Jun. 11, 2012

(51) Int. Cl.
*G01P 13/00* (2006.01)
*G01C 21/00* (2006.01)
*G01P 5/20* (2006.01)

(52) U.S. Cl.
CPC .......................................... *G01P 5/20* (2013.01)
USPC .................... 73/170.04; 348/135; 244/137.1; 701/3

(58) Field of Classification Search
None
See application file for complete search history.

(56) References Cited

U.S. PATENT DOCUMENTS

| 4,212,190 | A | 7/1980 | Coover et al. |
| 6,542,242 | B1 | 4/2003 | Yost et al. |
| 7,557,735 | B1 | 7/2009 | Woodell et al. |
| 7,765,863 | B1 | 8/2010 | Woolsey |
| 2005/0143904 | A1* | 6/2005 | Haas ............................. 701/120 |
| 2008/0078881 | A1* | 4/2008 | Parras ......................... 244/137.1 |
| 2012/0120230 | A1* | 5/2012 | Wilkerson et al. ............. 348/135 |
| 2012/0303261 | A1* | 11/2012 | Bernhardt ...................... 701/409 |
| 2013/0048787 | A1* | 2/2013 | Riley et al. .................. 244/137.1 |
| 2013/0325213 | A1* | 12/2013 | Mamidipudi et al. ............ 701/3 |
| 2014/0142788 | A1* | 5/2014 | Denton ............................. 701/3 |

FOREIGN PATENT DOCUMENTS

| EP | 0471742 B1 | 11/1994 |
| WO | 9601912 | 1/1996 |

* cited by examiner

*Primary Examiner* — Andre Allen
(74) *Attorney, Agent, or Firm* — Armstrong Teasdale LLP

(57) ABSTRACT

A method and system for detecting wind patterns in association with a cargo package airdrop. The method includes dispersing media into the atmosphere, tracking the dispersed media, wherein tracking includes at least one of using Sodar, Lidar, Radar, and optical imaging, determining a wind pattern proximate an airdrop landing using the tracked media, and determining an airdrop location position using the determined wind pattern.

18 Claims, 3 Drawing Sheets

METHODS AND SYSTEMS FOR WIND DETECTION

BACKGROUND

The field of the disclosure relates generally to detecting wind patterns, and more specifically, to methods and apparatus for detecting and predicting wind patterns associated with an airdrop.

Many times, aid is dispersed to areas in need of supplies via an airdrop from an aircraft. Often, these areas are located in developed areas, populated areas, or difficult terrain, which requires a precise drop in order for the cargo package to reach the intended recipient and without causing harm or damage. If the drop is incorrectly calculated, the cargo package could reach terrain problematic for retrieval (e.g., ocean and/or mountain). In order to successfully complete an airdrop on a predetermined target, it is necessary to know what the wind and other environmental conditions are in the vicinity of the target in close proximity to the area of the airdrop, specifically in the descent path. Wind travels at various speeds and directions, as well as being influenced by terrain and obstacles. It is thus desirable to monitor these environmental conditions immediately before and during a drop to correctly deliver the cargo package to the desired location.

Known systems for detecting wind speeds related to an airdrop include performing a flyover in which a test cargo package is dropped to measure and calculate the wind speeds and directions. However, in such a method the winds could change speed and direction from the time the test airdrop occurred until the time that the aircraft returns to the location for the actual payload drop, thus resulting in an inaccurate drop. As well, this approach causes extra fuel to be burned due to multiple passes and may expose the aircraft to added hazards of flight (e.g., terrain and/or other aircraft). Other systems of measuring wind speeds include detecting ambient dust particles using sensors, but such systems can be costly and/or bulky.

BRIEF DESCRIPTION

In one embodiment, a method for detecting atmospheric wind patterns in association with a cargo package airdrop is provided. The method includes dispersing media into the atmosphere, tracking the dispersed media, wherein tracking includes at least one of using Sodar, Lidar, Radar, and optical imaging, determining a wind pattern proximate an airdrop landing using the tracked media, and determining an airdrop location position using the determined wind pattern.

In another embodiment, a wind pattern detection system for detecting wind patterns in association with a cargo package airdrop is provided. The system includes an emitter configured to disperse media into the atmosphere, a first monitoring device configured to track the dispersed media, and a data processing system communicatively coupled to the monitoring device. The data processing system is configured to determine a wind pattern proximate an airdrop landing using the tracked media, and determine a drop location based on the cargo package configuration and the determined wind pattern.

In another embodiment, one or more computer-readable storage media having computer-executable instructions embodied thereon is provided. When executed by at least one processor, the computer-executable instructions cause the at least one processor to disperse media into the atmosphere using an emitter, track the dispersed media using a monitoring device, determine a wind pattern proximate a predetermined airdrop landing using the tracked media, and determine a drop location based on the determined wind pattern.

The features, functions, and advantages that have been discussed can be achieved independently in various embodiments or may be combined in yet other embodiments further details of which can be seen with reference to the following description and drawings.

DETAILED DESCRIPTION

The described embodiments are directed to methods and systems detecting and predicting wind patterns associated with an airdrop. Specifically, a system and method of measuring wind patterns are described for the purpose of preparing a cargo package to be released from an aircraft onto a predetermined location. As used herein, the terms "airdrop point", "airdrop location", and/or "airdrop landing" should be understood to include "waypoints" that are sets of coordinates identifying a point in physical space. Such points and/or locations can be given by Global Positioning System (GPS) coordinates or any other navigational system coordinate system.

Figure 1:
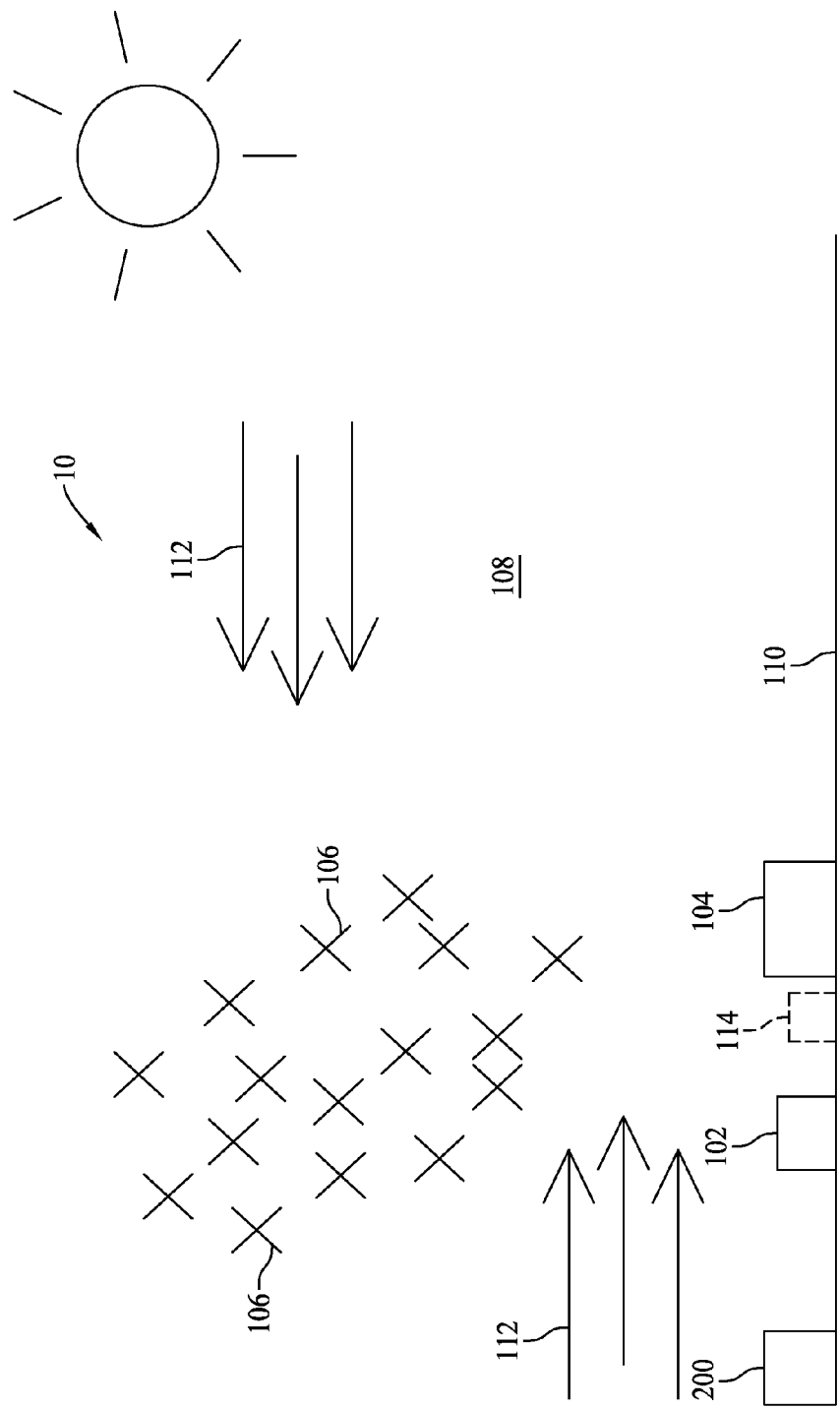
FIG. 1 is an illustration of an exemplary wind pattern detection system.

FIG. 1 is an illustration of a wind pattern detection system 10 which includes a wind data emitter 102 and a monitoring device 104. In the exemplary embodiment, wind data emitter 102 is configured to distribute media or reflective material 106 into the atmosphere 108 to detect wind data. Wind data can include any data associated with the movement of air over the Earth including but not limited to wind speed, wind direction, and other data, such as temperature, pressure, and humidity. A wind pattern includes an aggregation of wind data that includes, but is not limited to, a wind velocity (speed) and/or a wind direction at a particular elevation. Material 106 can include particles, objects, energy emissions, or combinations thereof. Examples of media 106 include but are not limited to reflective bodies or reflective powders such as glitter, retroreflective beads, soluble reflective cake decorations, flares, modular emitter of light, airborne emitter, LED arrays or micro-circuits, chemo-fluorescent nodules and other dispersed materials to aid processes described herein.

In the exemplary embodiment, wind data emitter 102 distributes media 106 into the atmosphere 108. In one embodiment, emitter 102 is a gun that launches media 106 into atmosphere 108. Alternatively, emitter 102 can be any projectile launching apparatus that is configured to distribute material 106 including, but not limited to, a power fired mortar, a grenade launcher, a pneumatic mortar, a liquid fueled mortar, a slingshot, a bow and arrow, and the like. In the exemplary embodiment, media 106 includes reflective material that is viewed and/or imaged by standard viewing techniques (i.e., a smartphone and/or camcorder), including, but not limited to, dust, glitter, and retroreflectors. In one embodiment, material 106 is dropped and/or released aloft by an aircraft including, but not limited to, an airplane, a helicopter, and a glider. It should be noted that the aircraft can be piloted by a remote control located outside of the aircraft or autonomously guided by computer.

In the exemplary embodiment, material 106 is dispersed into the atmosphere 108 such that monitoring device 104 can track the movement of material 106 in wind 112 as material 106 descends to the ground 110. In the exemplary embodiment, monitoring device 104 is a light detection and ranging (LIDAR) system that transmits a light beam towards material 106 and detects a light beam reflected from material 106. Alternatively, monitoring device 104 can be any device that is capable of viewing, tracking, and/or recording the movements of material 106 including, but not limited to a sonic detection and ranging (SODAR) system, a radar system and a Doppler radar system. In one embodiment, monitoring device 104 may include a handheld device, such as, without limitation, smartphones, personal digital assistants (PDAs), mobile network devices, and/or mobile handheld devices (e.g., an iPad® device), etc. In one embodiment, monitoring device 104 is configured to collect wind direction and strength data using audio information from induced wind noise. In such an embodiment, one or more microphones or differential noise sensing is used. The wind noise may be enhanced using wind resonant cavities (not shown), such as whistles and monitoring device 104 may have multi-directional capabilities or be held aloft and rotated to determine wind direction and strength (e.g., velocity and/or speed). In addition to tracking the movement of material 106, monitoring device 104 transmits the data to a data processing system 200 for wind data calculations.

In one embodiment, an illuminator 114 is used with monitoring device 104. In such an embodiment, illuminator 114 is configured to produce a light output, for example a light emitting diode (LED) output that illuminates material 106. Accordingly, monitoring device 104 (e.g., a video or sequential still camera) is configured to capture the movement of material 106 by measuring its displacement. It should be noted that the LED can be used in any wavelength including, but not limited to, visible, ultraviolet, and infrared. Illuminator 114 may be used to illuminate directionally as direct light sources to ground or airborne monitoring devices 104. Additionally, illuminator 114 may emit multi-color patterns of light and/or emit varying intensity of patterns of light (Frequency Patterns or Intensity Patterns) to be received by monitoring devices 104. These emissions may be sensed in direct path or as reflected signals off dispersed media 106.

FIG. 2 is a diagram of a data processing system 200 used with system 10 shown in FIG. 1. Data processing system 200 includes a communications fabric 202, which provides communications between a processor unit 204, memory 206, persistent storage 208, a communications unit 210, an input/output (I/O) unit 212, and a display 214. In one embodiment, data processing system 200 is incorporated into and housed within monitoring device 104.

Processor unit 204 is configured to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices such as a non-transitory computer readable media. A storage device is any piece of hardware that is capable of storing information either on a temporary basis and/or a permanent basis. Memory 206 may be, for example, a random access memory or any other suitable volatile or non-volatile storage device. Persistent storage 208 may take various forms depending on the particular implementation. For example, without limitation, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, without limitation, a removable hard drive may be used as persistent storage 208.

Communications unit 210 is configured for communication with monitoring device 104, and/or other data processing systems or devices. In one embodiment, communications unit 210 is in communication with an aircraft providing an air-dropped supply. In one embodiment, communications unit 210 is a network interface card. Communications unit 210 may provide communications through one or more of physical and wireless communication links.

Input/output unit 212 is configured for input and output of data with other devices that may be connected to data processing system 200. For example, without limitation, input/output unit 212 may be configured to provide a connection for user input through a keyboard and mouse. Further, input/output unit 212 may be configured to send output to a printer and/or display 214. Display 214 provides a mechanism to display information or data to a user.

Instructions for the operating system and applications or programs for determining wind data are located on persistent storage 208. These instructions may be loaded into memory 206 for execution by processor unit 204. The processes of the different embodiments may be performed by processor unit 204 using computer implemented instructions, which may be located in a memory, such as memory 206. These instructions may be referred to herein as program code, computer usable program code, or computer readable program code that is read and executed by processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 are together referred to as computer program product 220. In one example, computer readable media 218 is in a tangible form, such as, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 318 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or another device capable of storing and transmitting program code 216.

Figure 2:
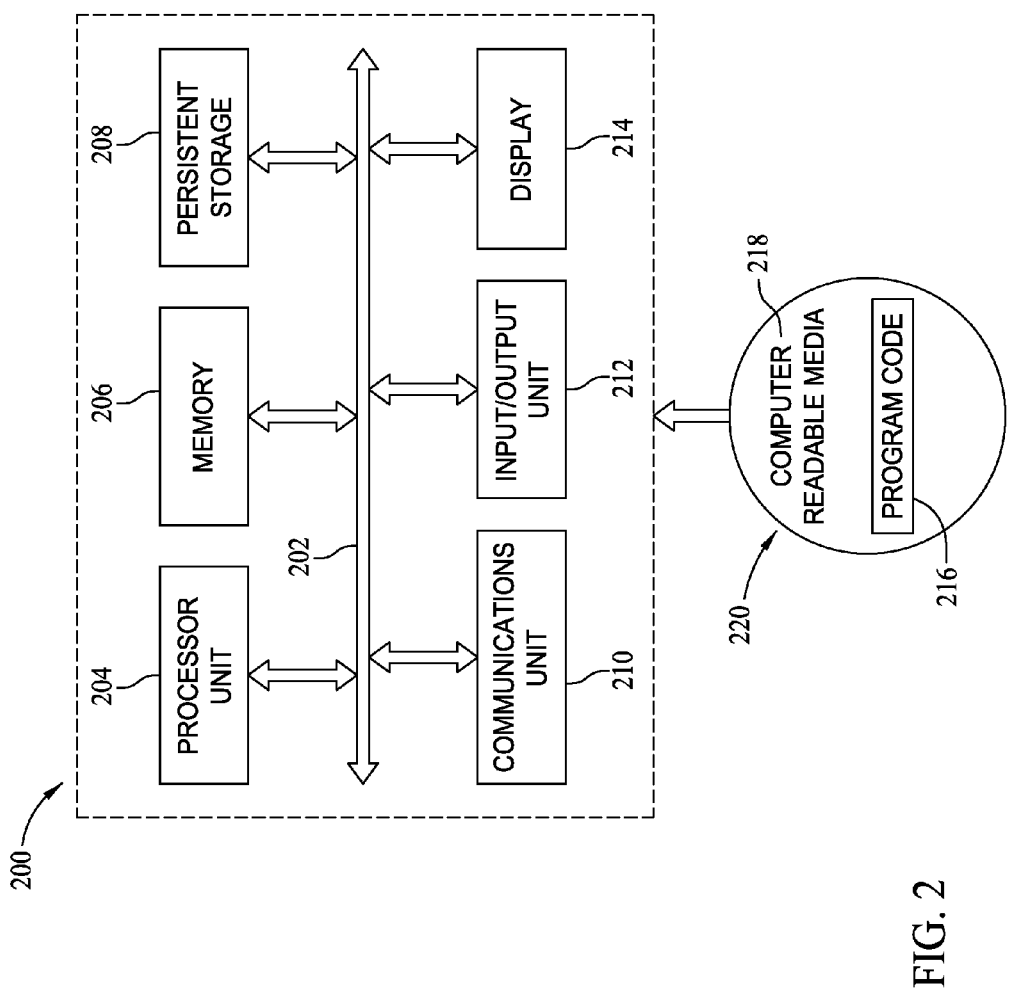
FIG. 2 is a diagram of a data processing system than can be used in the wind pattern detection system shown in FIG. 1.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 206 or a cache such as that found in an interface and memory controller hub that may be present in communications fabric 202.

Figure 3:
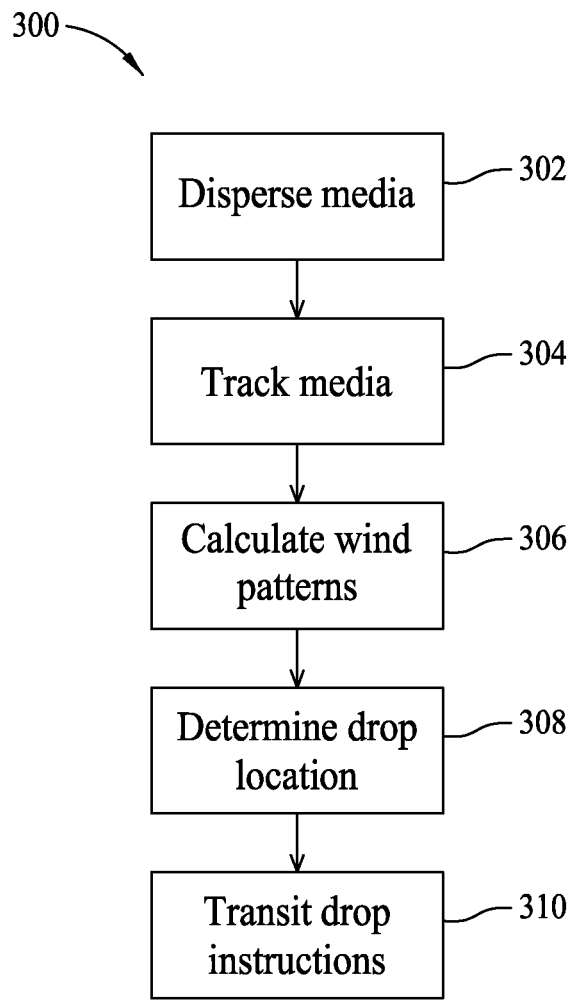
FIG. 3 is a flowchart illustrating a method for detecting wind patterns using the wind pattern detection system shown in FIG. 1.

As mentioned above, the above described system is operable for detecting wind conditions and/or patterns associated with an airdrop. FIG. 3 is a flowchart 300 illustrating one embodiment of a method for detecting wind patterns and determining an airdrop position using the above described system. The method includes disperses 302 media 106 into the atmosphere 108. As described above, media 106 can be dispersed by launching media 106 from emitter 102 or by dropping and/or releasing aloft by an aircraft.

In the exemplary embodiment, dispersed 302 media 106 includes reflective particles and/or powders including, but not limited to, glitter, retroreflective beads, soluble reflective cake decorations, flares, LED arrays or micro-circuits, chemo-fluorescent nodules. In one embodiment, dispersed 302 media 106 is dispersed from, or is itself a projectile that is launched skyward, such as, but not limited to, an M992 flare. In one embodiment, the projectile is itself reflective and may include a parachute that is released before the projectile descends to the ground. In another embodiment, dispersing 302 media 106 is an active ascent craft that is configured to provide a controlled descent, such as, but is not limited to, a hot air balloon or a helium balloon. The active ascent craft includes a material that can be tracked by monitoring device 104.

When media 106 is dispersed in atmosphere 108, displacements and/or locations of media 106 is tracked 304 by monitoring device 104 for use in determining wind patterns. In the exemplary embodiment, monitoring device 104 tracks 304 media 106 from the ground by recording or capturing a sequential set of still images. Alternatively, media 106 is tracked 304 by one or more video streams of media 106. In one embodiment, multiple monitoring devices 104 are utilized to track 304 media 106. In one embodiment, monitoring devices 104 are spaced a distance apart, e.g., a predetermined distance, from one another such that a triangulation of media 106 is determined using the location data received by each monitoring device 104. Alternatively, media 106 can be tracked 304 by a monitoring device 104 that is onboard an airborne aircraft. It should be noted that the aircraft may be piloted by a remote control located outside of the aircraft or autonomously guided by computer. Additionally, it should be noted that media 106 can be tracked 304 using any monitoring technology including but not limited to, Sodar, Lidar, Radar, Doppler radar, Ultrasound or by any combination thereof.

In the exemplary embodiment, monitoring device 104 and data processing system 200 are used to calculate 306 wind patterns from the data received by monitoring device 104. In one embodiment, wind patterns are calculated 306 by comparing a first location of media 106 to a second and/or final location of media 106 over a time period. In one embodiment, calculating 306 wind patterns includes determining a wind model that has a wind influence curve that can display the variations of wind with respect to the ground. In one embodiment, calculating 306 wind patterns includes utilizing terrain maps in calculation 306 to produce a wind model that may be displayed by display 214. In the exemplary embodiment, wind model is a wind column displaying a wind direction and velocity at particular elevations. Alternatively, wind model can be any representation of the wind data calculated 306 by tracking 304 media 106. Additionally, the terrain map can be used to determine wind flows from multiple sensing modalities to interpolate winds across time or space through correlated flow modeling and information obtained from a local weather station may be utilized. In addition, determining a wind pattern further includes obtaining a wind noise signature.

In the exemplary embodiment, a drop location is determined 308 as a result of the calculated 306 wind patterns. A drop location is determined 308 as a result of comparing the cargo package configuration (e.g., size, weight, controls, and aerodynamics) to the calculated 306 wind pattern such that the cargo package would land at or on a predetermined location and/or target. In the exemplary embodiment, "drop location" or "airdrop location" is a release point or waypoint that an airborne aircraft will drop and/or release the cargo package. In determining 308 a drop location, cargo package drop configuration is calculated to enable the cargo package to land on the predetermined landing location and/or target. For example, and not limitation, to ensure a successful drop on a predetermined landing, wind patterns are compared to a cargo package configuration (weight and parachutes used) to determine an drop location. Releasing the cargo package at the drop location enables the cargo package to be manipulated by winds such that the package is guided to the predetermined landing location.

In the exemplary embodiment, drop timing and operational instructions are transmitted 310 to personnel with control of the release of the cargo package on an aircraft, when a drop location is determined 308. In the exemplary embodiment, personnel having control of the release of the cargo package are an on-board flight crew. Alternatively, such personnel could be any person or apparatus in control of a drop including, but not limited to, a person remotely navigating an aircraft, a computer system on-board an aircraft, a computer system in wireless communication with an aircraft, and a robot on-board an aircraft.

Although the present disclosure is described with respect to processors and computer programs, as will be appreciated by one of ordinary skill in the art, the present disclosure may also apply to any system and/or program that is configured to determine and/or predict the wind patterns. For example, as used herein, the term processor is not limited to just those integrated circuits referred to in the art as processors, but broadly refers to computers, processors, microcontrollers, microcomputers, programmable logic controllers, application specific integrated circuits, and other programmable circuits. The processor may be part of a computer that may include a device, such as; a floppy disk drive or compact disc-read-only memory (CD-ROM) drive, for reading data from a computer-readable medium, such as a floppy disk, a CD-ROM, a magneto-optical disk (MOD), or a digital versatile disc (DVD).

Exemplary embodiments of methods and systems for use in detecting wind patterns used in aviation industry are described in detail herein. The disclosed systems would provide a cost effective manner for determining wind patterns in association with an airdrop. The systems described herein can be deployed utilizing readily available equipment such as a smartphone and/or tablet device or computer.

A technical effect of the system and method described herein includes at least one of: (a) dispersing media into the atmosphere; (b) tracking the dispersed media, wherein tracking includes at least one of using Sodar, Lidar, Radar, and optical imaging; (c) determining a wind pattern proximate an airdrop landing using the tracked media; and (d) determining an airdrop location position using the determined wind pattern.

Although the foregoing description contains many specifics, these should not be construed as limiting the scope of the present disclosure, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention as disclosed herein which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for detecting atmospheric wind patterns in association with a cargo package airdrop location, the method comprising:
    dispersing media into the atmosphere by at least one of projecting the media using a projectile launching apparatus and releasing the media from an aircraft;
    tracking the dispersed media, wherein tracking includes at least one of using Sodar, Lidar, Radar, and optical imaging;
    determining a wind pattern proximate an airdrop landing using the tracked media; and
    determining an airdrop location position based on a configuration of a cargo package to be dropped at the airdrop location and the determined wind pattern.

2. The method of claim 1, wherein tracking the dispersed media further comprises tracking the dispersed media by a first handheld device.

3. The method of claim 2, wherein tracking the dispersed media further comprises tracking the dispersed media by a second handheld device spaced a predetermined distance from the first handheld device and wherein determining a wind pattern further comprises triangulating a location of the media tracked by the first handheld device and the second handheld device.

4. The method of claim 2, wherein determining a wind pattern further comprises obtaining a wind noise signature from the first handheld device.

5. The method of claim 1, wherein dispersing media further comprises deploying a parachute.

6. The method of claim 1, wherein tracking by imaging further comprises at least one of recording a video of the dispersed media and recording still images of the dispersed media.

7. The method of claim 1, wherein tracking the dispersed media further comprises tracking the media aloft.

8. The method of claim 1, wherein determining a wind pattern comprises obtaining wind data from a weather station.

9. The method of claim 1, wherein dispersing media further comprises dispersing media that includes at least one of a modular emitter of light, an LED array, dust, glitter, retroreflectors, and a reflective body.

10. A wind pattern detection system for detecting wind patterns in association with a cargo package airdrop location, the system comprising:
    an emitter configured to disperse media into the atmosphere by at least one of projecting the media from the ground and releasing the media from an aircraft;
    a first monitoring device configured to track the dispersed media; and
    a data processing system communicatively coupled to the monitoring device, the data processing system configured to:
    determine a wind pattern proximate an airdrop landing using the tracked media; and
    determine a drop location based on a configuration of a cargo package to be dropped at the drop location and the determined wind pattern.

11. The wind pattern detection system of claim 10, further comprising a second monitoring device spaced a predetermined distance from the first monitoring device, wherein the data processing system is configured to triangulate a location of the media tracked by the first monitoring device and the second monitoring device.

12. The wind pattern detection system of claim 10, wherein the first monitoring device is further configured to obtain a wind noise signature.

13. The wind pattern detection system of claim 10, wherein the monitoring device utilizes at least one of Sodar, Lidar, Radar, Doppler, and optical imaging.

14. The wind pattern detection system of claim 10, further comprising an illuminator configured to illuminate the media.

15. The wind pattern detection system of claim 10, wherein the media includes at least one of a modular emitter of light, an LED array, dust, glitter, retroreflectors, and a reflective body.

16. One or more non-transitory computer-readable storage media having computer-executable instructions embodied thereon, wherein when executed by at least one processor, the computer-executable instructions cause the at least one processor to:
- disperse media into the atmosphere using an emitter that at least one of projects the media using a projectile launching apparatus and releases the media from an aircraft;
- track the dispersed media using a first monitoring device;
- determine a wind pattern proximate a predetermined airdrop landing using the tracked media; and
- determine a drop location based on a configuration of a cargo package to be dropped at the drop location and the determined wind pattern.

17. One or more computer-readable storage media having computer-executable instructions embodied thereon according to claim 16 wherein when executed by at least one processor, the computer-executable instructions cause the at least one processor to:
- track the dispersed media by a second monitoring device spaced a predetermined distance from the first monitoring device; and
- triangulate the media tracked by the first monitoring device and the second monitoring device.

18. One or more computer-readable storage media having computer-executable instructions embodied thereon according to claim 17 wherein when executed by at least one processor, the computer-executable instructions cause the at least one processor to:
- disperse media, from the emitter, that includes at least one of a modular emitter of light, an LED array, dust, glitter, retroreflectors, and a reflective body.

* * * * *